United States Patent Office 2,862,009
Patented Nov. 25, 1958

2,862,009

NEW WATER SOLUBLE QUATERNARY AMMONIUM SALTS

Otto Albrecht, Neuewelt, near Basel, Switzerland, assignor to Ciba Limited, Basel, Switzerland, a Swiss firm No Drawing. Original application December 7, 1953, Serial No. 396,739. Divided and this application February 24, 1955, Serial No. 490,399

Claims priority, application Switzerland December 12, 1952

2 Claims. (Cl. 260—348)

This application is a division of application Ser. No. 396,739, filed December 7, 1953, now abandoned, and relates to new water-soluble quaternary ammonium salts derived from a condensation product containing the radical of an alkylene diamine, one nitrogen atom of which is connected with an aliphatic high molecular hydrocarbon radical and with a hydroxyalkyl group, the other nitrogen atom being connected with an acyl radical of a high molecular aliphatic carboxylic acid.

These quaternary ammonium salts can be prepared, for example, by condensing an alkylene diamine which contains an aliphatic high molecular hydrocarbon radical bound to one nitrogen atom, with an aliphatic carboxylic acid of high molecular weight or with a functional derivative thereof, reacting the condensation product with a hydroxyalkylating agent, for example ethylene oxide, and treating the tertiary base so formed with a quaternating agent.

The alkylene diamines used as starting materials may be derived from compounds such as ethylene diamine or trimethylene diamine. The hydrocarbon radical of high molecular weight present in the said alkylene diamines may be of aliphatic or cycloaliphatic character. There come into consideration, for example, alkyl radicals containing 8–18 carbon atoms, such as the dodecyl, cetyl, octadecenyl or octadecyl radical, also branched radicals such as the 2-butyl octyl radical. Advantageously there are used diamines or compounds derived from diamines, especially compounds of this kind in which the two nitrogen atoms are separated from one another by an alkylene radical containing two or three carbon atoms. Such diamines containing an alkylene radical of three carbon atoms are easily accessible by the additive combination of acrylonitrile with an amine containing a radical of high molecular weight followed by reduction of the nitrile group to an amino group. For the preparation of such amines there may be used, for example, dodecylamine, octadecylamine, oleylamine, and also mixtures of amines which correspond to the fatty acids of coconut oil, soya bean oil or tall oil.

As second components for preparing the condensation products there are used compounds of high molecular weight which are capable of introducing an amide-like grouping, and for this purpose there may be used aliphatic carboxylic acids of high molecular weight and functional derivatives thereof, such as their acid chlorides, esters or amides. Among the carboxylic acids there may be mentioned caprylic acid, lauric acid, palmitic acid, stearic acid, oleic acid, linoleic acid, and also hardened train oil fatty acid or rosin acids such as abietic acid or naphthenic acids.

Reaction of the components described above in accordance with the invention may be carried out with the aid of heat at a high temperature, for example, of 90–180° C. However, acid chlorides react at lower temperature. It may be of advantage to conduct the reaction in an inert gas, for example, by introducing nitrogen, or under reduced pressure. Furthermore, it may be of advantage to use a solvent.

To obtain the hydroxyalkylated base the condensation product is reacted, for example, with ethylene oxide, in the presence of sodium metal at a temperature of about 130° in a current of nitrogen.

As quaternating agents for converting the tertiary hydroxyalkylated base into quaternary ammonium salts there may mentioned alkylating and aralkylating agents, such as dimethyl sulfate, ethyl bromide, benzyl chloride or para-chlorobenzyl chloride. Furthermore, there may be used epichlorhydrin.

The reaction between the tertiary amines and the alkylating or aralkylating agents, is carried out by heating the components, for example, at 90–120° C., until the reaction product is soluble in hot water. If desired an organic solvent may be used.

The quaternary ammonium salts of the present invention are soluble in water. They are also cation-active and exhibit a strong affinity for cellulose fibers. They can be used as textile assistants, for example, as wetting, foaming, dispersing or levelling agents, but they are especially effective as softening agents. Especially suitable as softening agents are the compounds which contain two aliphatic radicals containing 16–18 carbon atoms, for example, the amide radical of a fatty acid containing 16–18 carbon atoms, such as the radical of stearic acid amide and the residue of a corresponding alkylamine, for example octadecylamine. In general the products of the invention possess good heat resistance and do not yellow the treated textile fibers or do so only very slightly. When they are applied to dyed materials, the fastness to light of the dyeings is generally not or not strongly impaired. The new compounds are also very well suited for use in baths used to impart an anti-creasing finish, and in this manner the material treated can be given an anti-creasing finish and also a soft feel.

The following example illustrates the invention, the parts being by weight unless otherwise stated and the relationship of parts by weight to parts by volume being the same as that of the kilogram to the liter:

*Example*

21.8 parts of N-octadecyl-trimethylene diamine and 18 parts of commercial stearic acid are heated in a current of nitrogen for 2 hours at 155–160° C. and then for 6 hours at 165–170° C. The acylation product obtained in a yield of 37.4 parts is a bright wax-like mass, which after being taken up in warm glacial acetic acid, yields an opalescent solution with hot water.

30 parts of the acylation product are heated with 0.4 part of sodium in a current of nitrogen at 130° C., and then 2.3 parts of ethylene oxide are introduced in the form of a finely dispersed stream of gas. The temperature is then allowed to fall gradually to 122° C. There is obtained a pale solid mass which, when dissolved in warm glacial acetic acid, yields a feebly opalescent solution with hot water.

12.4 parts of the product described in the foregoing paragraph are heated with 3.7 parts of epichlorhydrin in a current of nitrogen for 6 hours on a boiling water bath. The volatile portions are distilled off under reduced pressure and the new quaternary ammonium salt is obtained in the form of a solid mass which can be taken up in hot water to form an opalescent solution. The new product can be used as a softening agent, for example, for polyacrylonitrile fibers.

What is claimed is:

1. The product of the formula

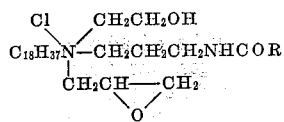

wherein R is the hydrocarbon radical of stearic acid.

2. A water-soluble quaternary ammonium salt of a tertiary amine which amine corresponds to the formula

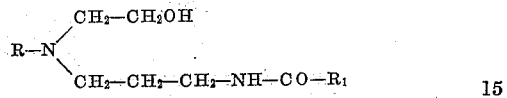

wherein R is a straight-chain alkyl radical with 16 to 18 carbon atoms and $R_1$ stands for a straight-chain alkyl radical with 15 to 17 carbon atoms, and the basic tertiary nitrogen atom of said tertiary amine being quaternized with a member selected from the group consisting of alkylating and aralkylating agents and epichlorhydrin.

References Cited in the file of this patent

UNITED STATES PATENTS

| | | |
|---|---|---|
| 2,589,674 | Cook | Mar. 18, 1952 |
| 2,474,202 | Rust | Jan. 21, 1949 |
| 2,541,816 | Glarum | Feb. 13, 1951 |
| 2,459,062 | Cook | Jan. 11, 1949 |
| 2,668,165 | Carpenter | Feb. 2, 1954 |
| 2,712,544 | Bersworth | July 5, 1955 |